UNITED STATES PATENT OFFICE.

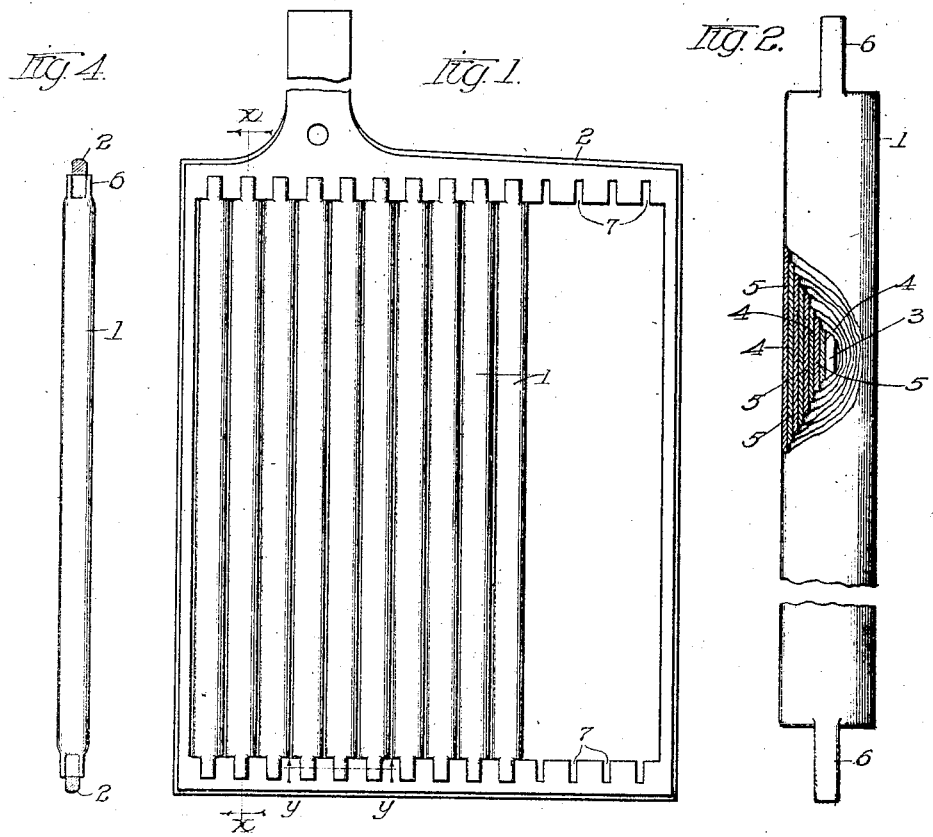
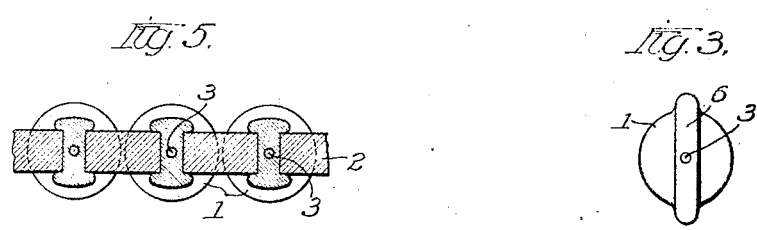

CAMPBELL C. CARPENTER, OF NIAGARA FALLS, NEW YORK, ASSIGNOR, BY MESNE ASSIGNMENTS, TO U. S. LIGHT & HEAT CORPORATION, OF NIAGARA FALLS, N. Y., A CORPORATION OF NEW YORK.

ALKALINE-BATTERY PLATE.

1,257,312.　　　Specification of Letters Patent.　　Patented Feb. 26, 1918.

Application filed October 18, 1912. Serial No. 726,485.

*To all whom it may concern:*

Be it known that I, CAMPBELL C. CARPENTER, a citizen of the United States, residing at Niagara Falls, in the county of Niagara and State of New York, have invented new and useful Improvements in Alkaline-Battery Plates, of which the following is a full, clear, concise, and exact description, reference being had to the accompanying drawing, forming a part of this specification.

This invention relates to alkaline battery plates.

An object of the invention is to provide a plate which is particularly adapted to withstand the expansion and contraction of its parts during the repeated charge and discharge and the resultant chemical action to which the plate is subjected.

Another object is to provide a battery plate in which the active material is in close contact with the current conductor, thereby insuring low internal resistance.

A further object is to provide a plate with elements which may be economically manufactured and which may be readily assembled to form a completed plate.

One form which the invention may assume is shown in the accompanying drawings, in which:

Figure 1 is an elevation of a plate frame with some of the active elements assembled therein.

Fig. 2 is an enlarged elevation of one of the active elements partially broken away.

Fig. 3 is an end view thereof, showing the element ready for assembling in the containing frame.

Fig. 4 is a section on the line $x$ $x$ of Fig. 1 with the active element shown in elevation.

Fig. 5 is an enlarged section on the line $y$—$y$ of Fig. 1.

The plate comprises active elements 1 held in place by means of a metallic frame or grid 2.

The active elements 1 for positive plates are in the form of rods formed on a wire 3 of pure nickel or other suitable material, on which is placed a thin layer 4 of some nickel compound such as nickel hydrate, nitrate or oxid. Around this is placed a gauze of very fine nickel wire 5, the meshes of which are of sufficient size to permit a large diffusion of the alkaline electrolyte. Over this gauze is placed another layer 4 of active material and over this another layer of wire gauze 5, thus alternating the compound and the wire until a rod is obtained of sufficient diameter to give the desired thickness to the finished plate.

Various methods may be employed in forming this rod. Thus, I may place the compound on the wire in a plastic state, dry the same and then braid the wire thereon; or the active material may be placed on the wire in a dry or plastic state by passing the material through suitable dies, thus putting it on under pressure. If placed on in a plastic state, it may then be passed through a heating chamber, annealed and then braided with the wire.

Various ways may also be provided for placing the wire over the active material. For example, the wire may be braided over metal or non-metal surfaces, which may later be dissolved out and eliminated, leaving a space for holding the active material; or the metal and wire may be braided over or through a mass of prepared active material, thus acting as a support for the active material.

The active element formed as above may be placed inside of a support or shell which will serve as a support for both the active material and the wire.

The completed elements formed as above may be made in any desired length, the length and number thereof depending on the capacity desired from the plate. The ends of the elements may then be mashed as at 6, Figs. 2 and 3, to facilitate assembling in the frame or grid. If additional strength or stiffness is desired in the rod, a reinforce may be provided by inserting thick metal pieces running lengthwise thereof.

The frame in a positive plate consists of a grid of nickel or suitable material provided with slots 7 at the top and bottom, in which the ends 6 of the rods may be placed and upset therein to hold the elements securely in place as shown more clearly in Fig. 5.

A similar construction may be provided for the negative plate, in which case the metals chosen would preferably be metallic iron wire with some form of iron compound, preferably iron oxid, and the frame would be constructed preferably of iron or steel.

The particular metals named in describing this plate are merely for purposes of illustration, as other suitable materials might be employed which, when completed into a plate as described, would result in a rigid construction providing a very efficient plate of low internal resistance for alkaline batteries.

What I claim as new and desire to secure by Letters Patent of the United States:

1. An active element for alkaline battery plates comprising a member composed of separate cylindrical layers of active material and of metallic wire gauze arranged alternately.

2. As an article of manufacture, a cylindrical member composed of a metallic wire and alternate layers of a compound of the same metal and gauze of the same metal.

3. A battery plate comprising a retaining frame and active elements held therein, said elements consisting of rods composed of concentric layers of active material, each layer being surrounded by an envelop of wire gauze.

4. An active element for positive plates for alkaline batteries, comprising a core of nickel wire and a coating of nickel compounds thereon and an inclosing envelop of nickel wire gauze.

5. An active element for positive plates for alkaline batteries comprising a nickel wire and alternate layers of a nickel compound, and metallic nickel gauze thereon.

6. The method of forming an active element for alkaline battery plates which consists in coating a metallic core with a plastic layer of metallic compounds, drying the same, forming thereon a metallic gauze, coating with a plastic layer of the metallic salts, and forming thereon an additional wire mesh.

7. The method of forming an active element for alkaline battery plates which consists in passing a metallic wire and a metallic salt in plastic state through suitable dies, drying and annealing the same, and inclosing the same in a wire gauze.

In witness whereof, I have hereunto subscribed my name in the presence of two witnesses.

CAMPBELL C. CARPENTER.

Witnesses:
  D. C. ATKINS,
  JAMES L. COUGHLIN.